Feb. 3, 1925.
G. E. SUNDBERG
LANDING NET
Filed Aug. 18, 1922
1,524,957
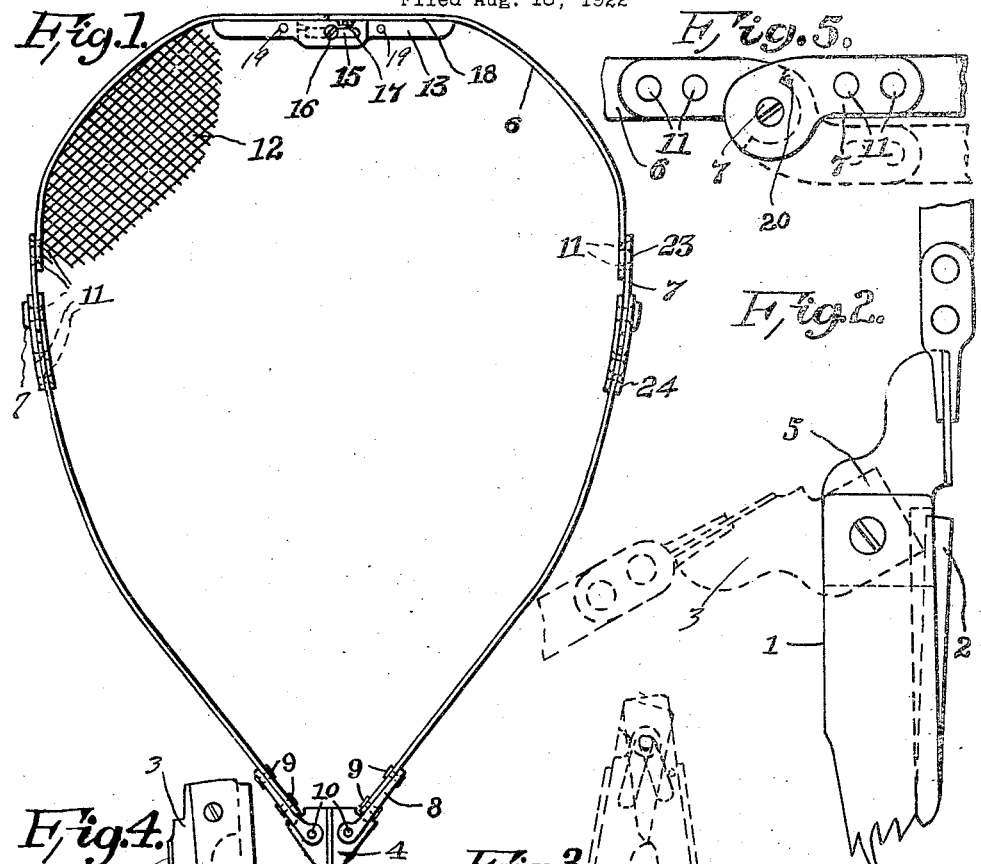
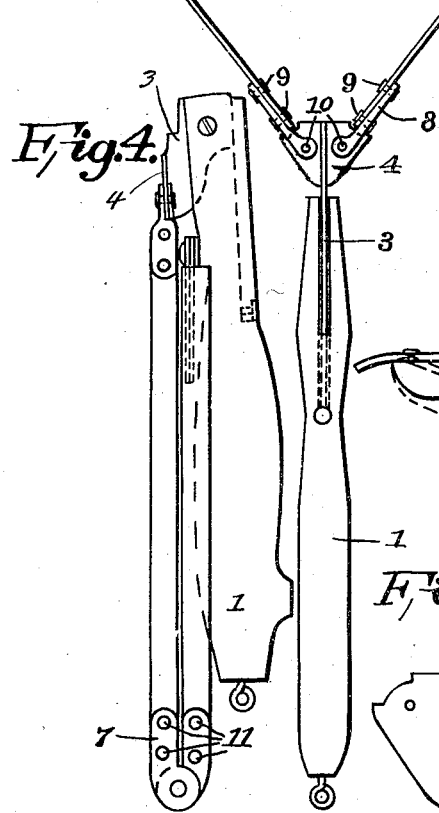
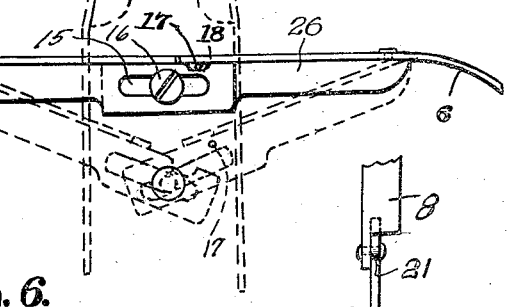
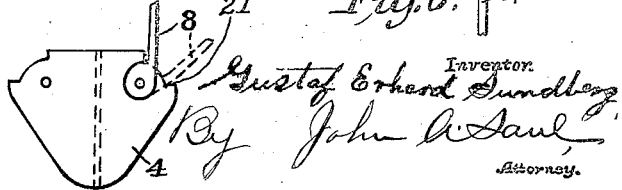

Patented Feb. 3, 1925.

1,524,957

UNITED STATES PATENT OFFICE.

GUSTAF E. SUNDBERG, OF GWINN, MICHIGAN.

LANDING NET.

Application filed August 18, 1922. Serial No. 582,708.

*To all whom it may concern:*

Be it known that I, GUSTAF ERHARD SUND-BERG, a citizen of the United States, residing at Gwinn, in the county of Marquette and State of Michigan, have invented certain new and useful Improvements in Landing Nets, of which the following is a specification.

My invention relates to nets for use in landing fish and the like, and more particularly to folding of collapsible frames for the same, so that the device may, when in disuse, be folded up and carried in a small space. It is composed of a resilient strip of metal that will retain its proper form when sprung into shape, and its handle may also be folded, and when in its extended position will be held in the same.

The principal object of the same is to so construct the device that not only will it be capable of folding up, but it may be easily and cheaply constructed, will be durable, efficient, will have but few parts, and can be easily repaired or the parts renewed with little difficulty.

In the drawings forming a part of this specification, and in which like symbols of reference represent coresponding parts in the several views:—

Figure 1 is a plan view of the device; showing a portion of the net, in its extended or operative position;

Figure 2 is a side detail, illustrating the handle and the spring for holding the net extended;

Figure 3 is a plan view, showing the locking means for the frame to hold it in its extended or open position;

Figure 4 is a view of the device in its folded position;

Figure 5 is a view of the joint in frame;

Figure 6 is a sectional view of the connecting piece showing a shoulder on the same for limiting the expansion of the frame; and, Figure 6ª is a side view, showing one of the framed hinges in detail.

In the drawings. the numeral 1 represents the handle of the device; 2 a spring in the handle for holding the net extended or in operative position; 3 is an arm attached to the connecting piece 4 of the frame; and 5 is a square end on arm 3 for engaging the spring. 6 is the frame of the net, being hinged at 7, said hinges having only a one-way hinge movement to prevent the frame from collapsing when in use; and 8 are arms connecting the frame 6 to the piece 4. 9 are rivets connecting the arms 8 to the frame 6; and 10 rivets pivotally connecting the arms to the piece 4.

11 are the rivets for the hinges 7; and 12 represents a portion of the net. 13 is a locking mechanism to hold the net in its extended position, the same being composed of overlapping metal ledges 25 and 26 with superimposed slots 15, through which a bolt 16 is passed On the ledge attached to arm 6 is a riveted pin 17 which engages in a notch 18 formed in the other ledge. The bolt 16 affords continuity, permitting the parts to turn upon the same. The pin 17 and notch 18, together with the tensile power of the strips keep the parts locked.

On both portions of the joint 13 are holes 19 for the purpose of tying the net, so that it will not interfere when the joint is in action, and is also an easy way of connecting the net to frame. The hinges 7 have a limiting projection or pin 20 attached to the handle part of the frame to lock it when extended. The strips are reinforced at 23 and 24 at this joint to prevent lateral swaying, and are reinforced at the arms 8 for the same purpose. 21 is a shoulder on each side of piece 4 to limit the excursion or expansion of the frame.

The operation of the device will be apparent from the foregoing description. The frame is composed of resilient material arranged in attachment with a relatively movable handle portion, so that the frame will assume a tensioned loop shape when extended; and when it is desired to fold the device the tensile power is overcome, as shown in Figure 3, the loop is destroyed by disengaging the pin from the notch and the strip assumes a parallel position held in continuity by the bolt.

When the device is folded the handle 1 is turned as shown in Figure 4, the sides of the frame collasped and turned flat upon itself; and when extended it is held by locking mechanism 13 and the hinge 7, limited by pin 20, thus permitting it to fold only in one direction.

Having now fully described my invention, what I claim as new, and desire to secure by Leters-Patent, is:—

1. A landing net, composed of a resilient, collapsible strip, a locking mechanism formed of overlapping metal strips having registering slots, a bolt in the slots to hold the strips in proper relation, a pin on one of the strips, and a notch formed on the outer edge of the other strip to receive the pin to lock the strips while the net is extended.

2. In a landing net, the combination with the frame formed of resilient metal, of a handle, a spring in the handle, and an angular arm on the end of the frame engaging the spring.

3. A landing net, comprising a collapsible resilient frame, a connecting piece formed with shoulders to limit play of the same, an arm attached to the connecting piece, and a handle provided with a locking hinge connected to the arm.

In testimony whereof I affix my signature.

GUSTAF E. SUNDBERG.